United States Patent
Sezgin et al.

(10) Patent No.: US 10,133,346 B2
(45) Date of Patent: Nov. 20, 2018

(54) GAZE BASED PREDICTION DEVICE AND METHOD

(71) Applicant: KOÇ ÜNIVERSITESI, Istanbul (TR)

(72) Inventors: Tevfik Metin Sezgin, Istanbul (TR); Cagla Cig Karaman, Istanbul (TR)

(73) Assignee: KOÇ ÜNIVERSITESI, Istanbul (TR)

( * ) Notice: Subject to any disclaimer, the term of this patent is extended or adjusted under 35 U.S.C. 154(b) by 27 days.

(21) Appl. No.: 15/314,947

(22) PCT Filed: May 30, 2014

(86) PCT No.: PCT/TR2014/000189
§ 371 (c)(1),
(2) Date: Nov. 30, 2016

(87) PCT Pub. No.: WO2015/183208
PCT Pub. Date: Dec. 3, 2015

(65) Prior Publication Data
US 2017/0199566 A1    Jul. 13, 2017

(51) Int. Cl.
*G06F 3/033* (2013.01)
*G09G 5/08* (2006.01)
(Continued)

(52) U.S. Cl.
CPC ............... *G06F 3/013* (2013.01); *G06F 3/033* (2013.01); *G06F 3/0485* (2013.01); *G06F 3/04845* (2013.01)

(58) Field of Classification Search
CPC ... G06F 3/04883; G06F 3/0482; G06F 3/0484
See application file for complete search history.

(56) References Cited

U.S. PATENT DOCUMENTS

| 6,873,314 B1 | 3/2005 | Campbell |
| 2005/0047629 A1 | 3/2005 | Farrell et al. |

(Continued)

FOREIGN PATENT DOCUMENTS

| EP | 2660581 A2 | 11/2013 |
| WO | WO2013033842 A1 | 3/2013 |

OTHER PUBLICATIONS

Cagla Cig et al: "Gaze-Based Virtual Task Predictor", Proceedings of the 8th International Symposium on Non-Photorealistic Animation and Rendering, NPAR '10, Nov. 16, 2014 (Nov. 16, 2014), pp. 9-14, XP055154827, New York, New York, USA DOI:10.1145/2666642.2666647 ISBN: 978-145-030125-1 Retrieved from the Internet: URL: http://iui.ku.edu.tr/sezgin_pubiicatians/2014/ICMI_GazeIn.pdf [retrieved on Nov. 25, 2014] the whole document.

(Continued)

*Primary Examiner* — Nan-Ying Yang
(74) *Attorney, Agent, or Firm* — Gokalp Bayramoglu

(57) ABSTRACT

The gaze-based prediction device for the prediction of the task that is intended to be performed by the user, includes at least one computer peripheral device for at least the movement of a cursor displayed on a visual display from an initial position to a final position, wherein the computer peripheral device is adapted to collect physical movement information from the user.

18 Claims, 7 Drawing Sheets

(51) Int. Cl.
  *G09G 5/00* (2006.01)
  *G06F 3/01* (2006.01)
  *G06F 3/0484* (2013.01)
  *G06F 3/0485* (2013.01)

(56) References Cited

U.S. PATENT DOCUMENTS

| | | |
|---|---|---|
| 2010/0201621 A1 | 8/2010 | Niikawa |
| 2011/0254865 A1 | 10/2011 | Yee et al. |
| 2012/0272179 A1* | 10/2012 | Stafford .................. G06F 3/012 715/781 |
| 2014/0009395 A1 | 1/2014 | Ku et al. |
| 2015/0331484 A1* | 11/2015 | Peterson ............ G06K 9/00604 345/156 |
| 2016/0048223 A1* | 2/2016 | Taguchi .................. G06F 3/013 345/157 |

OTHER PUBLICATIONS

Cagla Cig et al: "Gaze-based predicton of pen-based virtual interaction tasks", International Journal of Human-Computer Studies, vol. 73, Sep. 28, 2014(Sep. 28, 2014), pp. 91-106, XP055154831, ISSN:1071-5819, DOI: 10.1016/j.ijhcs.2014.09.005 abstract p. 97, left-hand column, line 9—p. 100, left-hand column, last line.

Ben Steichen et al: "User-adaptive information visualization", Proceedings of the 2013 International Conference on Intelligent User Interfaces, IUI'13, Mar. 19, 2013 (Mar. 19, 2013), p. 317, XP055154840, New York, New York, USA DOI:10.1145/2449396.2449439 ISBN:978-1-45-031965-2 abstract p. 317-p. 318, right-hand column, paragraph 1.

Franois Courtemanche et al: "Activity recognition using eye-gaze movements and traditional interactions", Interacting with Computers, Butterworth-Heinemann, GB, vol. 23, No. 3, Feb. 24, 2011 (Feb. 24, 2011), pp. 202-213, XP028386243, ISSN:0953-5438, DOI: 10.1016/J.INTCOM.2011.02.008 [retrieved on Mar. 4, 2011] pp. 202-203.

* cited by examiner

GAZE BASED PREDICTION DEVICE AND METHOD

CROSS REFERENCE TO RELATED APPLICATIONS

This application is the national phase entry of an International Application No. PCT/TR2014/000189 entering the national phase of the US, filed on 30 May 2014, the entire contents of which are incorporated herein by reference.

TECHNICAL FIELD

This invention relates to the gaze-based prediction of the tasks that is intended to be performed by the user via a gaze-based prediction device presented on a media screen such as a display.

BACKGROUND

A variety of input or control devices have been developed for interaction with microprocessor- or computer-based electronic devices. For example, keyboards have been developed to enter text-based data, which can include commands, to an electronic device. Buttons and switches have also been developed to allow a user to indicate or select a desired operating condition or other control parameter. Graphical user interfaces (GUI) have also been developed to provide a user friendly and intuitive interface for providing control inputs. A GUI system typically includes a graphical display that portrays one or more control icons and a user moveable and selectable cursor that is moved about the display. Via the moveable cursor, a user can select or indicate a control icon and select a desired control action.

Current approaches for mode switching between basic interaction tasks are device-specific and quite different from the direct manipulation style that most users are accustomed to. More importantly, some of these approaches cannot be employed in pen-based interaction because they require multiple contact points (e.g., multi-touch and multi-finger commands for zooming).

Pen-based devices are gaining popularity. Smart phones, tablet computers and digitizing tablet displays have penetrated our lives to a great extent due to their mobility, ease of use and affordable prices. However, despite what their name suggests, pen-based devices are not purely pen-based. For example, in pen-based smart phones, many actions force the user to put the pen aside and switch to multi-finger gestures (e.g. spread/pinch for zoom in/out, and swipe to navigate back/forward). These gestures require the simultaneous use of 2, 3 or even 4 fingers. The necessity of switching between pen and multi-touch input goes against the goal of seamless interaction in pen-based devices. Another example where we lose purely pen-based interaction is with tablet computers. In most pen-based applications, features are hidden in standard context/pop-up menus that are accessed via tapping and/or holding the pen on the tablet screen in various ways. In this case, the pen is used to emulate a mouse, which fits the traditional GUI/WIMP-based interaction paradigm, rather than that of a purely pen-based interaction. Even the state of the art devices and software specifically built for pen-based interaction lack purely pen-based interaction. For example, graphics tablets preferred mainly by digital artists such as Wacom Cintiq 24HD are often referred to as "heaven on earth" by users. However, even with these high-end models many tasks are still accomplished via on-pen or on-tablet external buttons called "express keys", "touch rings" and "radial menus". These buttons allow the user to simulate keystrokes including letters, numbers and modifier keys (e.g. Shift, Alt and Control). To issue a virtual manipulation command (e.g. scroll), the user has to locate the correct button which interrupts the interaction flow, hence causing an overall disappointing experience. In addition to not being purely pen-based, the use of smart gestures, soft menus, and external buttons has an adverse effect on adaptation. For example, as the number of tasks increases so does the diversity of smart gestures, available menus and external buttons that a user must learn and get accustomed to. Moreover, these methods of interaction are brand-, device- and application-specific, which, in fact, makes the situation even more complicated for users. The users have to dedicate a considerable amount of time and effort before they fully discover and start using various functionalities offered by their pen-based devices. However, users frequently have little interest in allocating time and effort for instruction and they would rather take a "walk-up-and-use" approach to software interfaces. These issues show that existing pen-based systems depend substantially on multi-finger gestures, context/pop-up menus and external buttons which goes against the philosophy of pen-based interfaces as a more intuitive interaction alternative.

In the embodiment of the prior art, command interfaces are used. The command interfaces are based on the eye-mind hypothesis M which intentional eye movements are associated with interface actions. In other words, in command interfaces, gaze is employed as an explicit computer peripheral device. This embodiment requires the gaze to be used for manipulation in addition to its natural purpose, visual perception.

In addition, this embodiment forces the user to be aware of the role of the eye gaze and therefore causes high cognitive workload.

In another embodiment of the prior art, non-command interfaces are used. The non-command interfaces are based on the computer system passively and continuously observing the user in real-time and providing appropriate responses. In order to provide satisfying and natural responses, the computer system must be able to infer user's intentions from his/her spontaneous natural behaviors. An intention can be, for instance, moving a window, scrolling a piece of text or maximizing an image. However, the majority of the related work on non-command interfaces focuses solely on monitoring and post-hoc analysis of eye movements collected dimming natural interaction.

U.S. Pat. No. 6,873,314 discloses a method and system for the recognition of reading, skimming and scanning from eye-gaze patterns. Eye-gaze patterns are accurately recognized when a user is reading, skimming, or scanning on a display filled with heterogeneous content, and then the method and system supply information tailored to meet individual needs. Heterogeneous content includes objects normally encountered on computer monitors, such as text, images, hyperlinks, windows, icons, and menus. Three distinct mechanisms are used; coarse or quantized representation of eye-movements, accumulation of pooled numerical evidence based detection, and mode switching. Analysis of text the user is reading or skimming may infer user interest and adapt to the user's needs.

GUI systems have employed a variety of interfaces for interacting with the GUI system to move and select the cursor as displayed on the display screen. A mouse can have a wired or wireless connection to the electronic device. Physical movement of the mouse, for example on a table, desk, mouse pad, and the like, are translated into corresponding movements of the cursor. A button or pressure switch is typically provided to allow a user to activate or "click" the cursor when moved to the desired location. Trackballs work in a similar manner; however movement of the cursor is induced via rotational movement of the trackball rather than the gross movement of a mouse. Track pads or mouse pads allow a user to trace or swipe their fingertip across the pads to effect movement of the cursor. Tapping on the track pad or activation of a separate switch activates or clicks the cursor. Electronic devices can also be provided with touch screens such that a user may indicate directly on a display the desired control icon and corresponding control input.

These computing devices typically require a separate control device, such as a mouse or game controller, to interact with the computing device's user interface. Users typically use a cursor or other selection tool displayed in the user interface to select objects by pushing buttons on the control device. Users also use the control device to modify and control those selected objects (e.g., by pressing additional buttons on the control device or moving the control device). Training is usually required to teach the user how movements of this control device map to the remote user interface objects. Even after the training, the user sometimes still finds the movements to be awkward.

SUMMARY

The aim of the present invention is the prediction of the task that is intended to be performed by the user by combining cursor movement and eye gaze data.

BRIEF DESCRIPTION OF DRAWINGS

The gaze-based prediction device realized in order to attain the aim of the present invention is illustrated in the attached figures, where.

Figure 1:
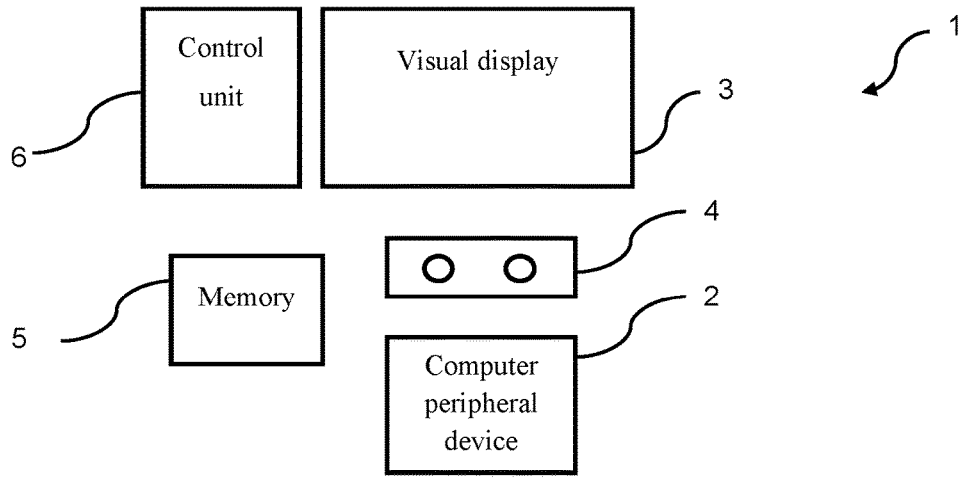
FIG. 1—schematic view of the present invention.
Figure 2:
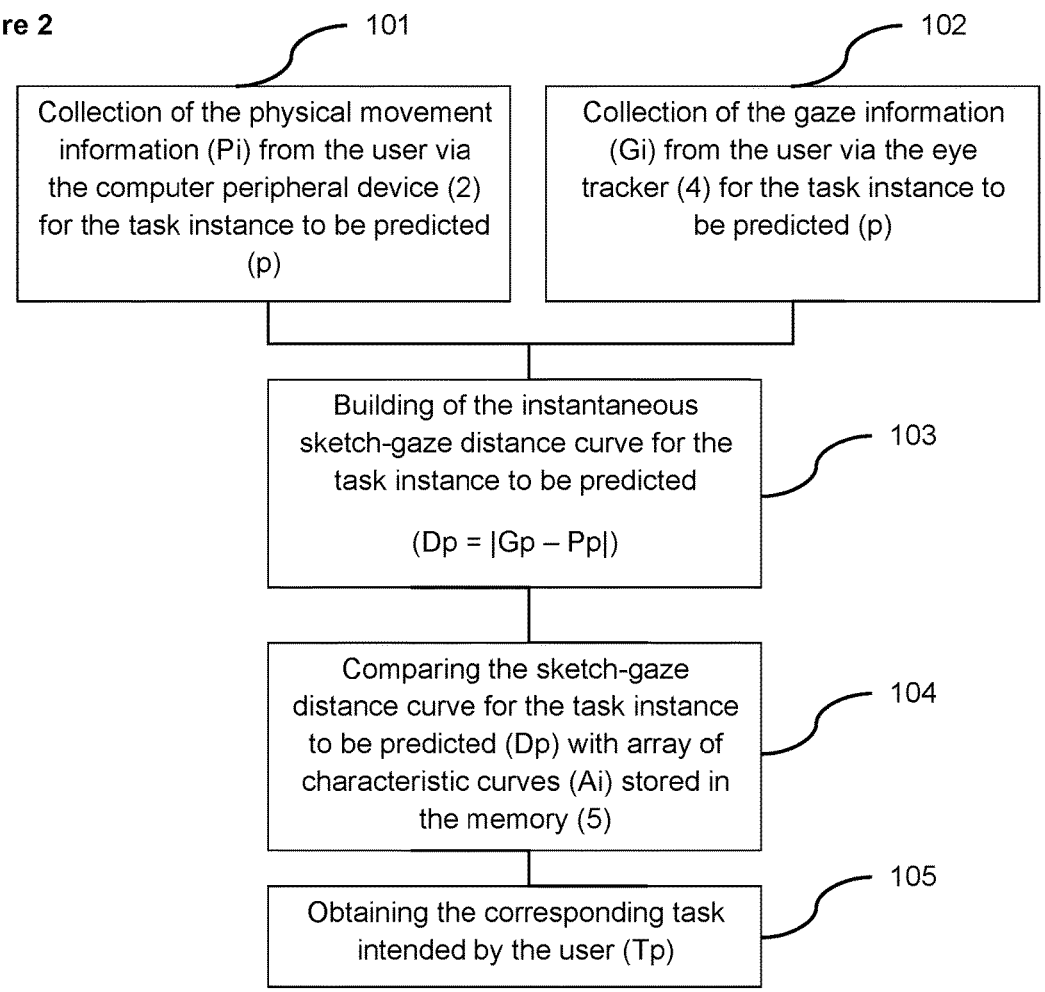
FIG. 2—the flow diagram of the control method of the present invention.
Figure 3:
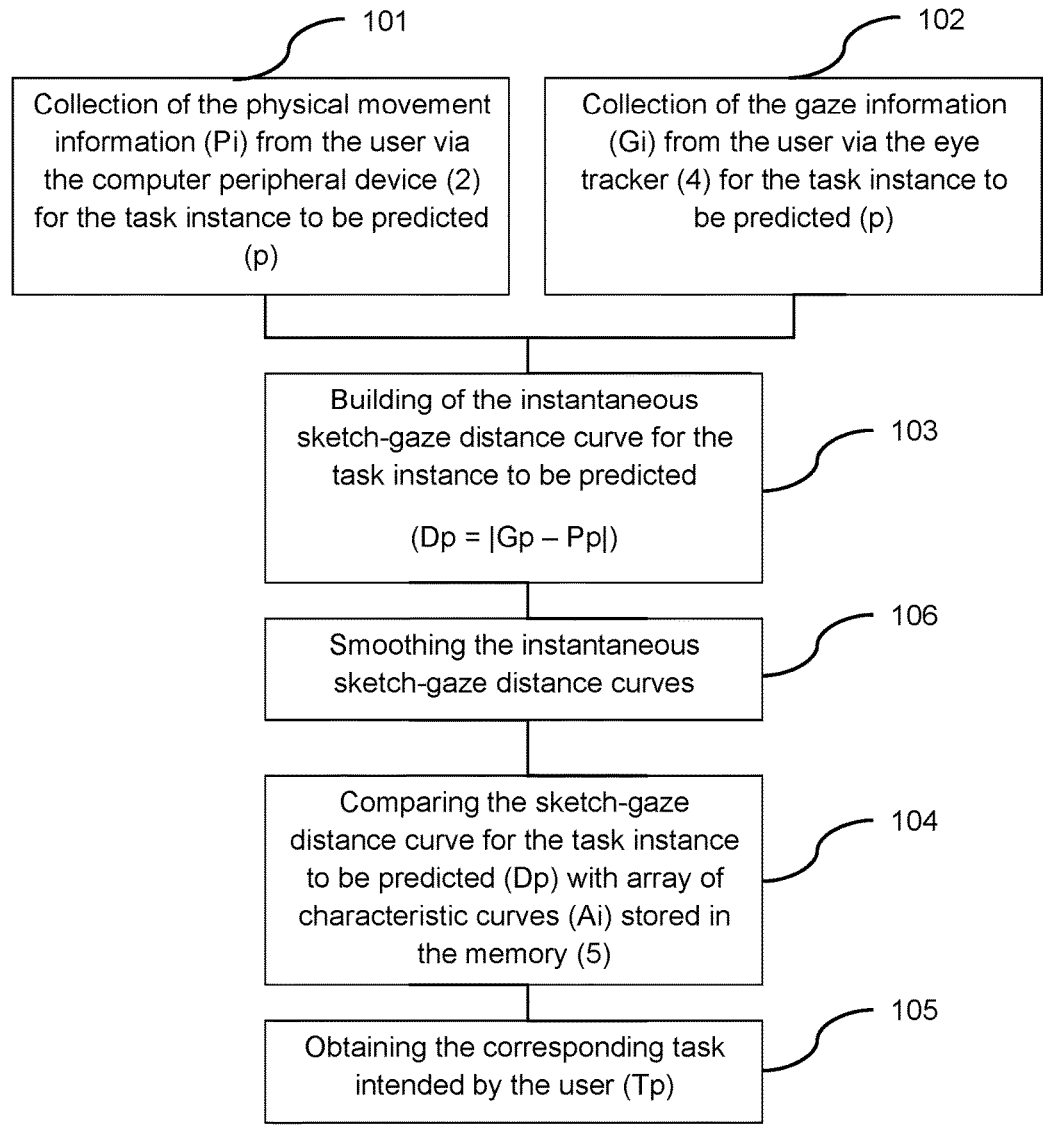
FIG. 3—the flow diagram of the control method in another embodiment of the present invention.
Figure 4:
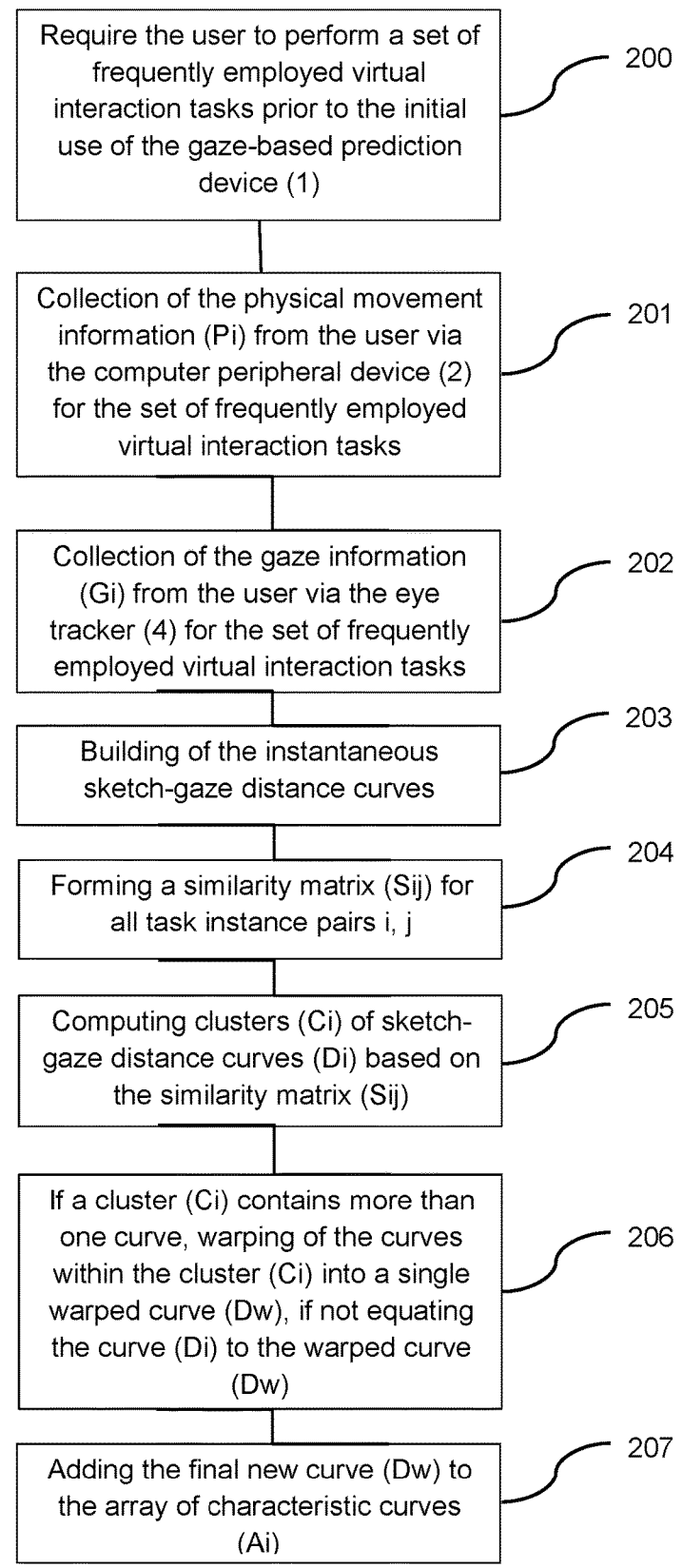
FIG. 4—the flow diagram of the control method in another embodiment of the present invention.
Figure 5:
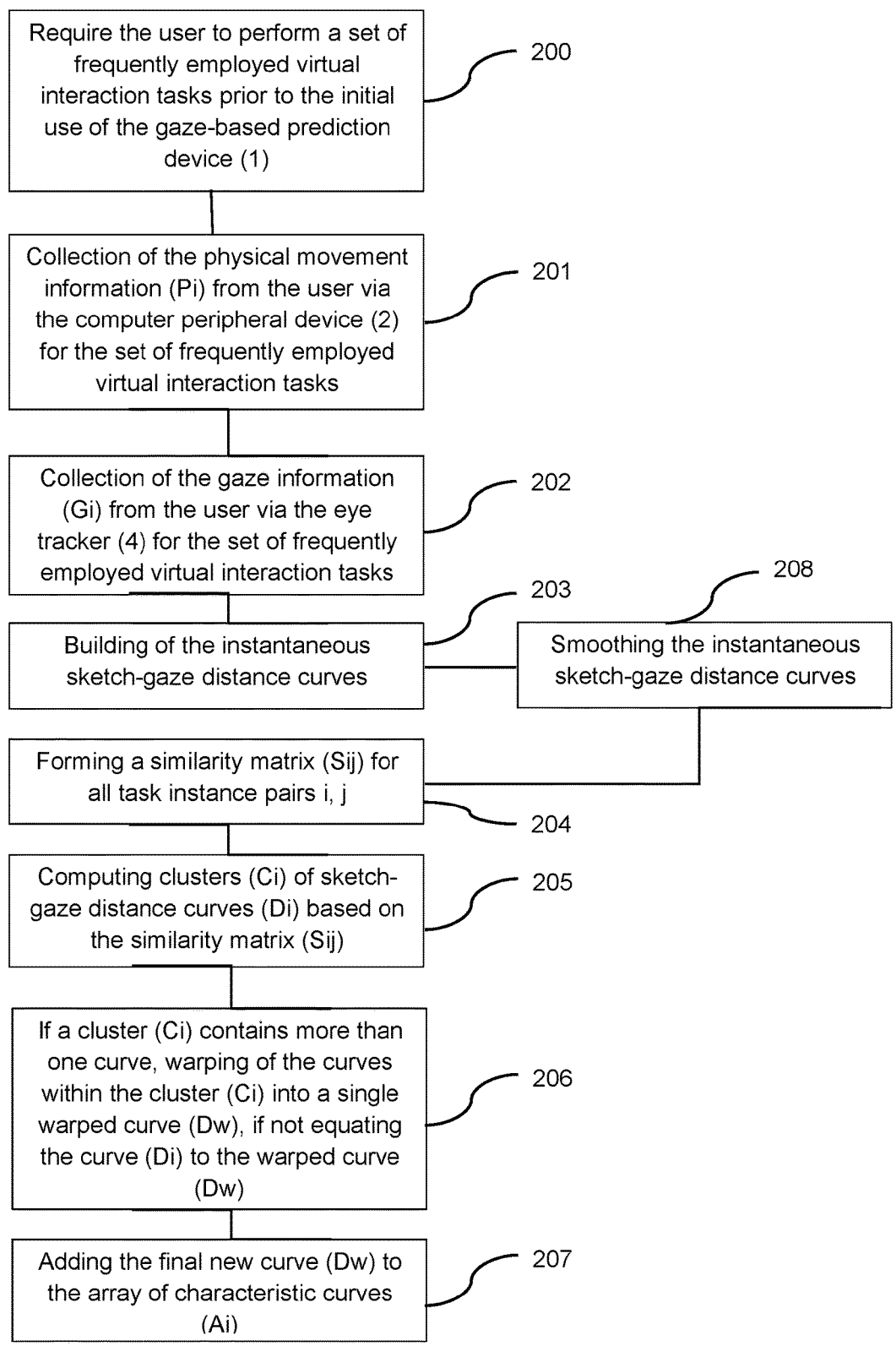
FIG. 5—the flow diagram of the control method in another embodiment of the present invention.
Figure 6:
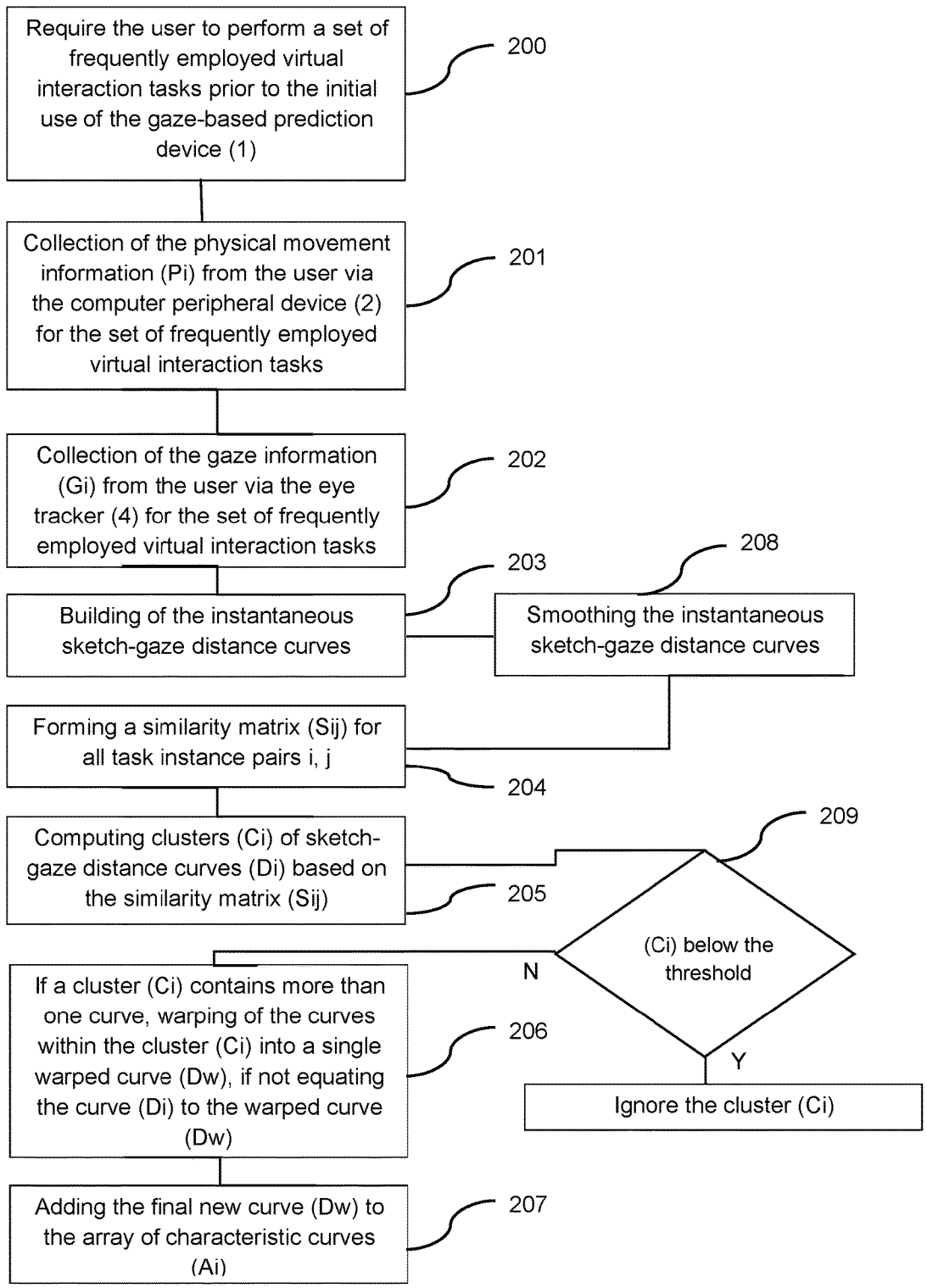
FIG. 6—the flow diagram of the control method in another embodiment of the present invention.
Figure 7:
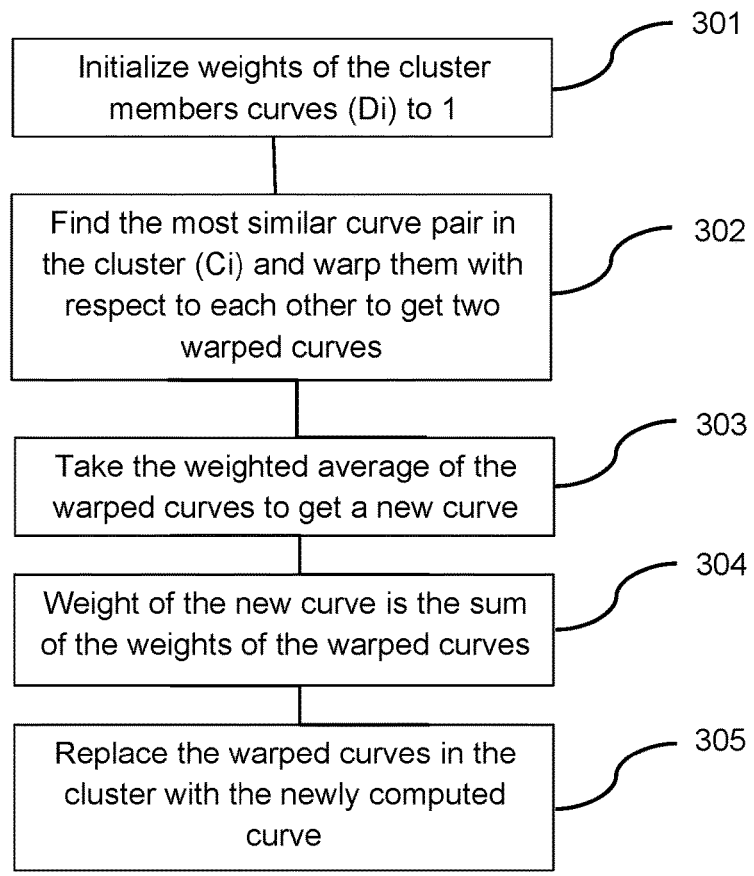
FIG. 7—the flow diagram of the control method in another embodiment of the present invention.
Figure 8:
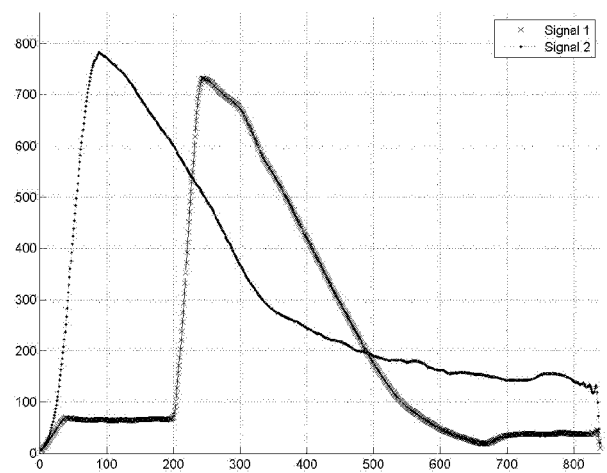
FIG. 8—A pair of original sketch-gaze distance curves.
Figure 9:
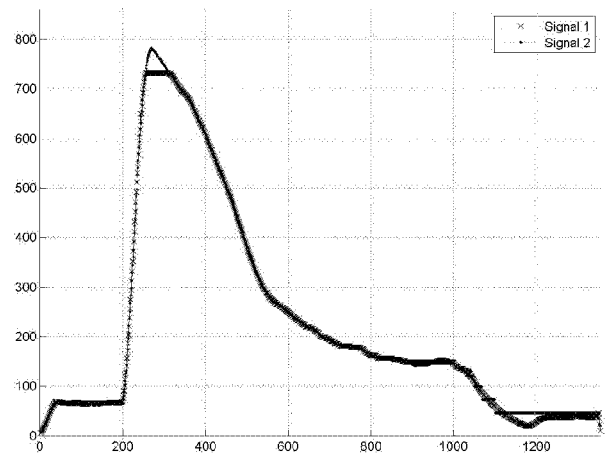
FIG. 9—A pair of warped sketch-gaze distance curves.

7. Gaze-based prediction device
8. Computer peripheral device
9. Visual display
10. Eye tracker
11. Memory
12. Control unit

DETAILED DESCRIPTION

The gaze-based prediction device (1) for the prediction of the task that is intended to be performed by the user, comprising at least one computer peripheral device (2) for at least the movement of a cursor (C) displayed on a visual display (3) from an initial position (Xi) to a final position (Xf), wherein the computer peripheral device (2) is adapted to collect physical movement information (Pi) from the user and the gaze-based prediction device (1) further comprises at least one eye tracker (4) adapted to collect gaze information (Gi) from the user, at least one memory (5) adapted to store an array of predetermined characteristic curves (Ai) representing the sketch-gaze distance curve for a specific task intended by the user (Ti) versus task intended by the user (Ti) and at least one control unit (6) which collects the instantaneous physical movement information (Pi) of the computer peripheral device (2) and the gaze information (Gi) received by the eye tracker (4), wherein the said control unit (6) is adapted to build an instantaneous sketch-gaze distance curve for the task instance to be predicted by making calculations using the gaze information (Gi) and physical movement information (Pi) and compare the sketch-gaze distance curve for the task instance to be predicted (Dp) with the array of characteristic curves (Ai) stored in the memory (5) in order to obtain the corresponding task intended by the user (Tp).

In the present invention the gaze information (Gi) is the x and y positions of the gaze of the user on the visual display (3) during the execution of a particular task and the physical movement information (Pi) is the position of the computer peripheral device (2). The distance between these points (Di=Gi−Pi) evolves in a strongly task-dependent fashion throughout the completion of a task instance. In other words, distance curves (Dt) computed for task instances of the same type have similar rise/fall characteristics, while those of different task types have quite different profiles. A curve representative of the characteristics of task for all task types is computed and recorded as predetermined characteristic cures (Ai) is stored in the memory. During the use of the gaze-based prediction device (1) the distance curve of an unknown task instance currently being performed is compared to these characteristic curves (Ai) and the amount of matching is used for task identification.

Gaze-based prediction device (1) of the present invention is a device with computing or information technology capability such as personal computer, laptop, tablet, smart phone, television or a consumer device having a display. Computer peripheral device (2), may be a stylus (pen), a mouse or other cursor controlling device such as a touch sensitive screen or pad, trackball, or any other suitable apparatus.

Physical movement information (Pi) is movements on the visual display (3) by at least one user using a computer peripheral device (2). While a user uses a computer peripheral device (2) the physical movement information (Pi) is collected from the movement of the tip of the computer peripheral device (2) from an initial position (Xi) to a final position (Xf) during the execution of a particular task.

The gaze information (Gi) collected by the eye tracker (4) is in principle where the user is looking. Gaze information (Gi) obtained from the user may be based on or determined from one or both eyes.

The collected gaze information (Gi) is composed of gaze points each represented as an array of local UNIX timestamp, remote UNIX timestamp, validity bit, horizontal location and vertical location information sampled at 120

Hz. Validity bit, horizontal location and vertical location information are obtained for the left and right eye individually.

In the preferred embodiment of the present invention the control unit (6) is adapted to require the user to perform a set of frequently employed virtual interaction tasks prior to the initial use of the gaze-based prediction device (1) for the creation of the array of characteristic curves (Ai) stored in the memory (5).

Briefly, our system is built as follows: Initially we collect sketch and gaze data during a number of pen-based interaction tasks and build a multimodal database. We then extract novel gaze-based features from this database and train a task prediction model using supervised machine learning techniques. These steps are executed only once. Afterwards, our system is ready for practical usage. During practical usage, each sketch stroke triggers our system to predict the class of the pen-based interaction task performed by the user. Predictions are done based on the trained model and the features extracted from the corresponding sketch and gaze data of the user. If a task is a frequently employed virtual interaction task (Tf) and hence has been defined previously the prediction is made accordingly and it is then no longer necessary to define the task first.

In a version of the above disclosed embodiment frequently employed virtual interaction tasks (Tf) stored in the memory (5) are drag, maximize, minimize, scroll and freeform drawing.

Based on the instantaneous physical movement information (Pi) collected by the computer peripheral device (2) and the gaze information (Gi) collected by the eye tracker (4) during the preformation of the set of frequently employed virtual interaction tasks prior to the initial use of the gaze-based prediction device (1), the array of characteristic curves (Ai) is formed by the control unit (6) and stored in the memory (5) for the further use of the gaze-based prediction device (1).

Different virtual interaction tasks result in different mixtures of saccadic and smooth-pursuit eye movements along the task trajectory. During saccadic eye movements, the users attend to the beginning/end points of the task trajectory which results in clusters of fixations at those points. In smooth-pursuit eye movements, eye gaze follows a smooth trajectory which results in fixations scattered along the pursuit path. Hence, a measure within the gaze information (Gi) on how the gaze points are clustered and spread out along the trajectory of the task carries discriminative information for task identification. This is captured by looking at the mean within-cluster variance of clustered gaze points.

In the present invention the computer peripheral device (2) and the eye tracker (4) collects the physical movement information (Pi) and the gaze information (Gi) respectively in a time-synchronized fashion.

In the preferred embodiment of the present invention the control unit (6) informs the user visually whether both eyes have been found by the eye tracker (4).

In a version of the above disclosed embodiment the control unit (6) further informs the user to adjust their posture based on the visual information provided.

In a version of the above disclosed embodiment the visual information provided is in the form of a gaze tracking status bar. The bar stays green as lone as the eye tracker (4) is functioning properly, but turns red if the eye tracker (4) loses the eyes. Gaze information collected while the status bar is red is marked as invalid by the eye tracker (4).

In a version of the above disclosed embodiment the control unit (6) is adapted to calculate after the completion of a given task, the percentage of valid gaze data to assure that at least 80% of the collected gaze data is valid. In cases where less than 80% of the gaze packets are valid, the control unit (6) restarts the current task automatically and warns the user via an audio message instructing him/her to assume a correct posture and maintain an appropriate distance to the visual display (3).

In an embodiment of the present invention during the data collection phase, at the beginning of a given task, the control unit (6) delivers non-distracting (in terms of avoiding unsolicited gaze behavior) audio instructions via headphones.

In the preferred embodiment during the data collection phase when users execute a task, positions of the computer peripheral device (2)—down and computer peripheral device (2)—up events respectively define the starting and ending points. To insure that starting and ending points of a task do not act as confounding variables, the tasks were designed to have overlapping starting/ending points.

In an embodiment of the present invention, the gaze-based prediction device (1) is controlled by the control unit (6) according to the following method (A):
Collection of the physical movement information (Pi) from the user via the computer peripheral device (2) for the task instance to be predicted (p) (101),
Collection of the gaze information (Gi) from the user via the eye tracker (4) for the task instance to be predicted (p) (102),
Building of the instantaneous sketch-gaze distance curve for the task instance to be predicted (Dp=|Gp−Pp|) (103),
Comparing the sketch-gaze distance curve for the task instance to be predicted (Dp) with may of characteristic curves (Ai) stored in the memory (5) (104),
Obtaining the corresponding task intended by the user (Tp) (105).

In another embodiment of the present invention, the control method (A) comprises the below steps in addition to the above mentioned steps:
After the step of building the instantaneous sketch-gaze distance curves (Di=|Gi−Pi|) (103), smoothing the instantaneous sketch-gaze distance curves (Di=|Gi−Pi|) (106)

In an embodiment of the present invention the control method (B) comprises the below steps prior to the step (101):
Require the user to perform a set of frequently employed virtual interaction tasks prior to the initial use of the gaze-based prediction device (1) (200),
Collection of the physical movement information (Pi) from the user via the computer peripheral device (2) for the set of frequently employed virtual interaction tasks (201),
Collection of the gaze information (Gi) from the user via the eye tracker (4) for the set of frequently employed virtual interaction tasks (202),
Building of the instantaneous sketch-gaze distance curves (Di=|Gi−Pi|) (203),
Forming a similarity matrix (Sij) for all task instance pairs i, j (204)
Computing clusters (Ci) of sketch-gaze distance curves (Di) based on the similarity matrix (Sij) (205),
If a cluster (Ci) contains more than one curve, warping of the curves within the cluster (Ci) into a single warped curve (Dw), if not equating the curve (Di) to the warped curve (Dw) (206),
Adding the final new curve (Dw) to the array of characteristic curves (Ai) (207)

In another embodiment of the present invention, the control method (B) comprises the below steps in addition to the above mentioned steps:

After the step of building the instantaneous sketch-gaze distance curves (Di=|Gi−Pi|) (203), smoothing the instantaneous sketch-gaze distance curves (Di=|Gi−Pi|) (208)

In a version of the above mentioned embodiment the control method (B) comprises the below steps after the step (205) mentioned above:

Comparing clusters (Ci) with a predetermined threshold stored in the memory (5) (209), If the (Ci) is below the threshold ignore the cluster (Ci), if not continue to step (206), The predetermined threshold in the above described embodiment is the number of repetitions. In the preferred embodiment, the number of repetitions is a constant value. In an embodiment of the above method (B) the similarity matrix (Sij) in the step (204) is formed using dynamic time warping distance metric between Di and Dj.

In an embodiment of the above method (B) the clusters (Ci) in the step (205) are computed via hierarchical clustering.

In a version of the above mentioned embodiment warping of the curves within the cluster (Ci) in the step (206) comprises the below steps:

Initialize weights of the cluster members curves (Di) to 1 (301)

Find the most similar curve pair in the cluster (Ci) and warp them with respect to each other to get two warped curves (302)

Take the weighted average of the warped curves to get a new curve (303)

Weight of the new curve is the sum of the weights of the warped curves (304)

Replace the warped curves in the cluster with the newly computed curve (305)

The invention claimed is:

1. A gaze-based prediction device for the prediction of a task to an electronic device, intended to be performed by a user, comprising at least one computer peripheral device that provides at least the movement of a cursor displayed on a visual display from an initial position to a final position, wherein the computer peripheral device is adapted to collect physical movement information from the user and the gaze-based prediction device;
    at least one eye tracker adapted to collect gaze information which is positions of the gaze of the user on a visual display of the electronic device during the execution of a particular task,
    at least one memory adapted to store an array of predetermined characteristic curves where the characteristic curves are a predetermined sketch-gaze distance curve built from the distances between gaze information and a physical movement information which is the position of the computer peripheral device on the visual display during the execution of the said particular task, and
    at least one control unit which collects the instantaneous physical movement information of the computer peripheral device on the visual display and the gaze information received by the eye tracker respectively in a time-synchronized fashion, wherein the said control unit is adapted to build an instantaneous sketch-gaze distance curve for the task instance to be predicted and compares the predetermined sketch-gaze distance curve for the task instance to be predicted with the array of characteristic curves stored in the memory in order to obtain the corresponding task intended by the user;
    wherein the frequently employed virtual interaction tasks stored in the memory are drag, maximize, minimize, scroll and free-form drawing.

2. The gaze-based prediction device according to claim 1, wherein the control unit is adapted to require the user to perform a set of frequently employed virtual interaction tasks prior to the initial use for the creation of the array of characteristic curves stored in the memory.

3. The gaze-based prediction device according to claim 1, wherein the control unit informs the user visually whether both eyes have been found by the eye tracker.

4. The gaze-based prediction device according to claim 3, wherein the control unit further informs the user to adjust their posture based on the visual information provided.

5. The gaze-based prediction device according to claim 3, wherein the control unit provides visual information in the form of a gaze tracking status bar such that the bar stays green as long as the eye tracker is functioning properly, but turns red if the eye tracker loses the eyes.

6. A control method for a gaze-based prediction device wherein the gaze-based prediction device includes at least one computer peripheral device that provides at least the movement of a cursor displayed on a visual display from an initial position to a final position, wherein the computer peripheral device is adapted to collect physical movement information from a user and the gaze-based prediction device characterized by
    at least one eye tracker adapted to collect gaze information which is positions of the gaze of the user on a visual display of the electronic device during the execution of a particular task,
    at least one memory adapted to store an array of predetermined characteristic curves where the characteristic curves are a predetermined sketch-gaze distance curve built from the distances between gaze information and a physical movement information which is the position of the computer peripheral device on the visual display during the execution of the said particular task, and
    at least one control unit which collects the instantaneous physical movement information of the computer peripheral device on the visual display and the gaze information received by the eye tracker respectively in a time-synchronized fashion, wherein the said control unit is adapted to build an instantaneous sketch-gaze distance curve for the task instance to be predicted and compares the predetermined sketch-gaze distance curve for the task instance to be predicted with the array of characteristic curves stored in a memory in order to obtain the corresponding task intended by the user;
    wherein the control method comprises the steps of:
    step 101: collection of the physical movement information from the user via the computer peripheral device for the task instance to be predicted,
    step 102: collection of the gaze information from the user via the eye tracker for the task instance to be predicted,
    step 103: building of the instantaneous sketch-gaze distance curve for the task instance to be predicted,
    step 104: comparing the sketch-gaze distance curve for the task instance to be predicted with array of characteristic curves stored in the memory,
    step 105: obtaining the corresponding task intended by the user;

wherein the below steps are performed prior to the step 101:
- step 200: require the user to perform a set of frequently employed virtual interaction tasks prior to the initial use of the gaze-based prediction device,
- step 201: collection of the physical movement information from the user via the computer peripheral device for the set of frequently employed virtual interaction tasks,
- step 202: collection of the gaze information from the user via the eye tracker for the set of frequently employed virtual interaction tasks,
- step 203: building of the instantaneous sketch-gaze distance curves,
- step 204: forming a similarity matrix for all task instance pairs,
- step 205: computing clusters of sketch-gaze distance curves based on the similarity matrix,
- step 206: if a cluster contains more than one curve, warping of the curves within the cluster into a single warped curve, if not equating the curve to the warped curve,
- step 207: adding the final new curve to the array of characteristic curves.

7. The control method according to claim 6 wherein after the step 103 of building the instantaneous sketch-gaze distance curves, a step 106 of smoothing the instantaneous sketch-gaze distance curves is performed.

8. The control method according to claim 6 wherein after the step 203 of building the instantaneous sketch-gaze distance curves, a step 208 of smoothing the instantaneous sketch-gaze distance curves is performed.

9. The control method according to claim 6 wherein the below steps are performed after the step 205:
- step 209: comparing clusters with a predetermined threshold stored in the memory,
- step 210: if the cluster is below the threshold ignore the cluster, if not continue to the step 206.

10. The control method according to claim 6, wherein the similarity matrix in the step 204 is formed using dynamic time warping distance metric between the instantaneous sketch-gaze distance curves of the task instance pairs.

11. The control method according to claim 6, wherein the clusters in the step 205 are computed via hierarchical clustering.

12. The control method according to claim 6, wherein the warping of the curves within the cluster in the step 206 comprises the below steps:
- step 301: initialize weights of the cluster members curves to 1,
- step 302: find the most similar curve pair in the cluster and warp them with respect to each other to get two warped curves,
- step 303: take the weighted average of the warped curves to get a new curve,
- step 304: weight of the new curve is the sum of the weights of the warped curves,
- step 305: replace the warped curves in the cluster with the newly computed curve.

13. A gaze-based prediction device according to claim 1 wherein the gaze information on how the gaze points are clustered and spread out along the trajectory of the task carries discriminative information for task identification which is captured by the control unit by looking at the mean within-cluster variance of clustered gaze points.

14. The gaze-based prediction device according to claim 1, wherein the control unit informs the user visually whether both eyes have been found by the eye tracker.

15. The control method according to claim 8 wherein the below steps are performed after the step 205:
- step 209: comparing clusters with a predetermined threshold stored in the memory,
- step 210: if the cluster is below the threshold ignore the cluster, if not continue to the step 206.

16. The control method according to claim 8, wherein the similarity matrix in the step 204 is formed using dynamic time warping distance metric between the instantaneous sketch-gaze distance curves of the task instance pairs.

17. The control method according to claim 9, wherein the similarity matrix in the step 204 is formed using dynamic time warping distance metric between the instantaneous sketch-gaze distance curves of the task instance pairs.

18. The control method according to claim 8, wherein the clusters in the step 205 are computed via hierarchical clustering.

* * * * *